United States Patent [19]

Klug

[11] 4,153,964

[45] May 15, 1979

[54] OSCILLATING GEAR RATCHET DRIVE

[75] Inventor: Alan G. Klug, Oshkosh, Wis.

[73] Assignee: J. I. Case Company, Racine, Wis.

[21] Appl. No.: 924,197

[22] Filed: Jul. 13, 1978

[51] Int. Cl.² .................. E01H 1/04; F16D 11/00
[52] U.S. Cl. ........................................................ 15/83
[58] Field of Search .................. 15/79 R, 79 A, 83; 56/DIG. 6; 192/46

[56] References Cited

U.S. PATENT DOCUMENTS

| 510,886 | 12/1893 | Broome | 56/DIG. 6 |
| 1,984,966 | 12/1934 | Dohm | 192/46 X |
| 4,042,994 | 8/1977 | Sassaman | 15/79 R |

*Primary Examiner*—Edward L. Roberts
*Attorney, Agent, or Firm*—Dressler, Goldsmith, Clement, Gordon & Shore, Ltd.

[57] ABSTRACT

An oscillating gear ratchet drive unit transmits rotating motion and torque from a drive gear to a driven shaft in a preselected direction of rotation and includes a shaft and a gear operably connected to a drive gear and positioned transversely with respect to the shaft and supported by the shaft. Ratchet crown wheels are provided on the opposing major faces of the gear and have camming surfaces for producing axial movement of the gear on the shaft, with each camming surface terminating in an axial surface. Pins project radially outwardly from the shaft adjacent to each ratchet crown wheel and engage an axial surface to the drive shaft, and are adapted to engage the camming surfaces to move the gear axially whenever the shaft rotates faster than the gear, while also accommodating and limiting axial movement of the gear on the shaft.

16 Claims, 5 Drawing Figures

U.S. Patent
May 15, 1979
4,153,964
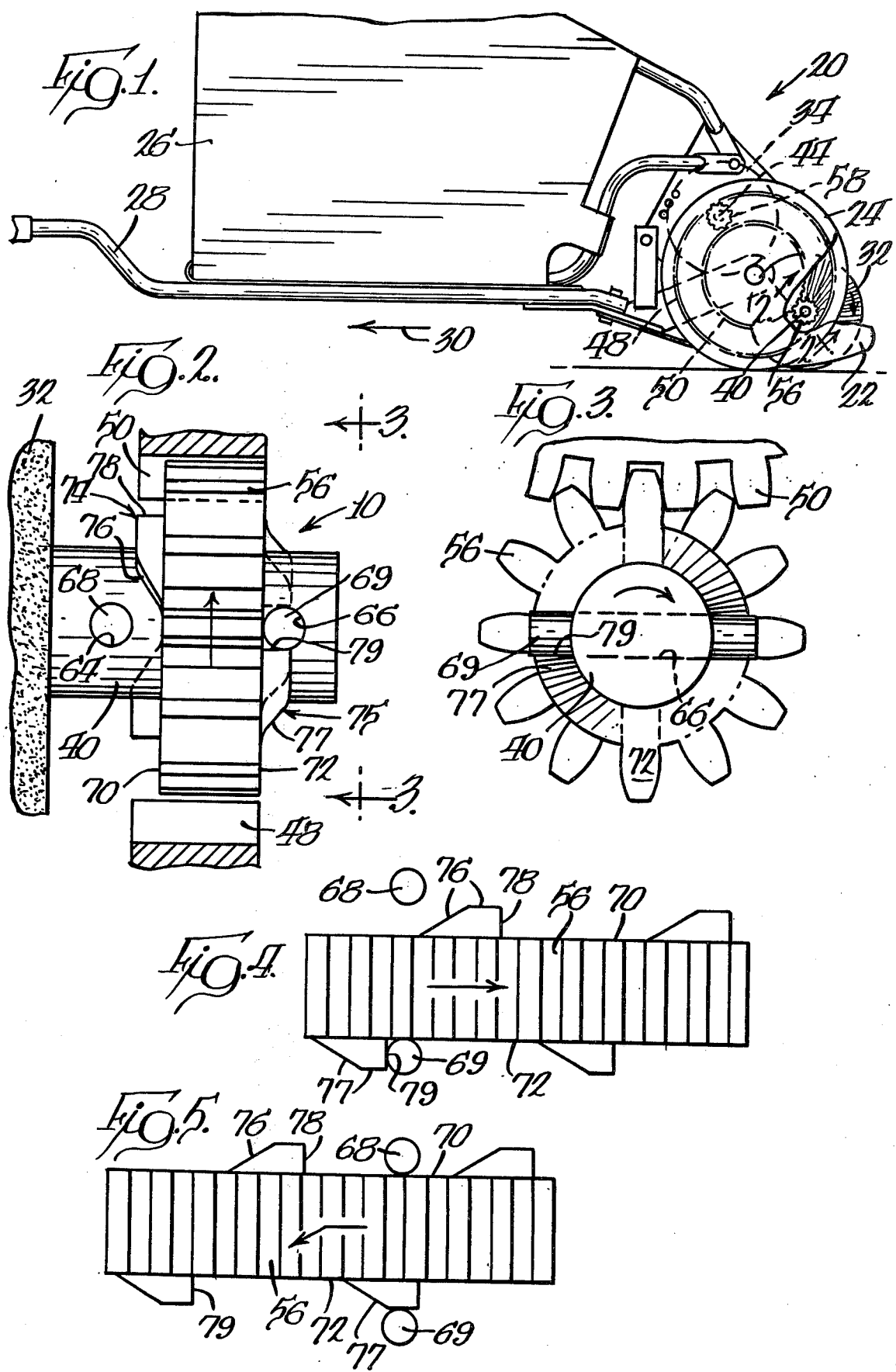

OSCILLATING GEAR RATCHET DRIVE

BACKGROUND OF THE INVENTION

The present invention relates to ratchet drive units for providing rotating motion and torque in a preselected direction only.

Various systems have been employed for providing a driving motion between a drive member and a driven member in one direction while accommodating relative movement in the opposite direction. The most common type of system consists of a one-way clutch which provides a positive drive in one direction and which has ratchet members or equivalent means for allowing relative rotation in the opposite direction. However, such systems are rather complicated requiring a number of parts which increases the overall cost.

SUMMARY OF THE INVENTION

According to the present invention, a simplified ratchet drive system has been developed which requires a minimum number of parts.

The ratchet drive unit includes a pinion gear on a shaft. The gear has a pair of opposing major faces and is positioned transversely with respect to the shaft and is supported by the shaft. Ratchet crown means is provided on each of the major faces of the pinion gear. The ratchet crown means has camming surfaces for producing axial movement of the pinion gear on the shaft, and each of the camming surfaces terminates in an axial surface. Means is provided for accommodating axial movement of the pinion gear on the shaft. Projecting means protrude radially outwardly from the shaft adjacent to each ratchet crown means and is adapted to engage at least one of the axial surfaces to drive the shaft, and move the pinion gear axially.

Preferably, the camming surfaces are spaced apart with the circumferential distance between the camming surfaces exceeding the circumferential length of the camming surfaces, and the camming surfaces on the opposing faces of the gear are offset in their entirety with respect to the camming surfaces on the opposite face of the gear. The camming surfaces project outwardly in an axial direction from the major faces of the gear by a predetermined distance.

It is also preferred to have the projecting means comprise a pair of pins, with the distance between the pins being at least as great as the width of the gear plus the predetermined distance and less than the width of the gear plus twice the predetermined distance minus the radius of the pin if the pin is round. It is desirable to have the ratchet crown means integral with the gears.

It is another advantage of the present invention that there is less wear to the components than occurs with conventional ratchet drive units. The pinion gear as used with the present invention is also stronger than conventional ratchet drive gears that are designed to occupy the same space because greater wall thickness can be employed.

It is a feature of the present invention that two or more gears can be connected to a live axle or shaft and to corresponding drive wheels, and will turn independently of one another proportionate to the rate of rotation of the corresponding drive wheels, and the shaft will turn at the rate of the faster rotating gear.

An illustrative implement with which the invention can be used is a rotary lawn sweeper which has a positive drive resulting from rotation of at least a pair of wheels along the ground.

The rotary sweeper has a pair of ground traversing drive wheels each having internal and external drive gears concentric with the axis of the wheels. A rotary ground engaging brush is mounted on a shaft and has an axis of rotation parallel to the axis of the wheels and has a pair of pinion gears which mesh with one of the drive gears. A second rotary brush is mounted on a shaft and has an axis of rotation parallel to the axis of the wheels and above the plane of the ground engaging brush and has a pair of pinion gears meshing with the other of the drive gears. The drive gears provide the brushes with a positive drive in opposite directions for propelling particulate material to a collection hopper.

BRIEF DESCRIPTION OF THE SEVERAL VIEWS OF THE DRAWINGS

FIG. 1 is a side view, partially cut away to show interior details of a sweeper assembly and an oscillating gear ratchet drive unit of the present invention;

FIG. 2 is a cross-sectional view taken along line 2—2 in FIG. 1;

FIG. 3 is a side view taken along line 3—3 in FIG. 2; and

FIGS. 4 and 5 are schematic views of the oscillating gear in different positions.

DETAILED DESCRIPTION OF THE PREFERRED EMBODIMENT

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

The ratchet drive unit 10 of the present invention provides for relative motion between a shaft and a drive wheel or between two drive wheels, and is particularly suitable for use with ground driven implements, such as lawn sweepers as depicted in FIG. 1.

The ratchet drive unit includes a shaft 40 which defines a pair of spaced-apart transversely extending cylindrical openings 64 and 66. Projecting means, such as pins 68 and 69, are inserted through openings 64 and 66 and protrude radially outwardly from the shaft 40 (FIG. 3). One or more of the pins may be integral with the shaft.

A pinion gear 56 is positioned transversely with respect to the shaft and is supported by a portion of the shaft 40. The gear has a pair of opposing major faces 70 and 72 and is operably connected to a drive gear 50.

The ratchet drive unit further includes ratchet crown means on both of the major faces of the gear. As illustrated in FIG. 2, the ratchet crown means includes ratchet crown wheel 74 on face 70 of the gear 56 and ratchet crown wheel 75 on face 72 of the gear 56. The ratchet crown wheels are preferably integral with the gear and have a plurality of camming surfaces 76 and 77, respectively, which each terminate in axial surfaces 78 and 79, respectively. As shown in FIG. 4, camming surfaces 76 and 77 include the entire raised portions of the ratchet crown means.

The camming surfaces on each ratchet crown wheel are spaced apart with the circumferential distance between immediately adjacent camming surfaces exceeding the circumferential length of each camming surface, and the camming surfaces on each face of the gear are offset in their entirety with respect to the camming surfaces on the opposite face of the gear, as shown in FIGS. 4 and 5. The circumferential distance between immediately adjacent camming surfaces must be great enough to accommodate one of the pins as well, as can be seen in FIG. 4.

The camming surfaces each project outwardly from the major faces of the gear by a predetermined distance along the axis of the shaft. The distance between the pins 68 and 69 preferably is about equal to the width of the gear plus the predetermined distance, so long as there is clearance for the gear to rotate about the shaft relative to the pins; however, the distance between the pins can be greater and may range up to the width of the gear plus twice the predetermined distance minus the radius of the pin if a round pin is used.

In operation, one of the pins, such as pin 69 in FIGS. 2 and 4, engages one of the axial surfaces 79 to drive the shaft. In this position, the gear 56 and the shaft 40 are rotating at the same speed.

When the gear 56 is rotating slower than the shaft 40, the gear rotates relative to the shaft, and a camming surface 77 engages the pin 69 (FIG. 5), thereby producing relative rotation of the slower rotating gear with respect to the shaft, and the engagement of the camming surface 77 by the pin 69 moves the gear 56 axially relative to the shaft. If the gear 56 is still rotating slower than the shaft, a camming surface 76 will engage pin 68 and move the gear axially relative to the shaft, but in the opposite direction. The pins will continue to alternately engage the camming surfaces on the opposing major faces of the gear, and the gear will move back and forth, i.e., will oscillate, axially relative to the shaft, until the gear and shaft again rotate at the same speed. When the gear 56 and the shaft 40 rotate at the same speed, one of the axial surfaces will be engaged by one of the pins to drive the shaft. Thus, the pins 68 and 69 accommodate and limit the axial movement of the gear, and only one pin engages the gear at any given moment.

Similarly, relative rotational movement between the shaft and a drive member is provided by having the projecting means alternately engage the camming surfaces on opposing major faces of the drive member to produce axial movement of the drive member with respect to the shaft. The drive member will move back and forth relative to the shaft until the drive member and the shaft again rotate at the same speed.

Referring to FIG. 1, the disclosed embodiment of the sweeper assembly 20 includes an enclosed housing 22, ground engaging and supporting wheels 24, a collection hopper 26 and a draw bar assembly 28. The draw bar assembly may be connected to a tractor or other vehicle to pull the sweeper assembly along the ground in the direction of arrow 30.

The sweeper assembly further includes a rotary ground engaging or sweeper brush 32 and a second rotary brush 34 located adjacent and above the sweeper brush 32 within the housing. As the sweeper assembly is drawn along the ground, the brushes are caused to rotate in opposite directions to lift leaves, grass and other debris, which is propelled into the hopper 26. The sweeper brush 32 lifts the debris from the ground and the second rotary brush 34 propels the debris into the hopper. The second rotary brush 34 preferably rotates at a greater speed than the ground engaging brush 32, such that the debris picked up by the ground engaging brush does not accumulate between the brushes and the material is propelled into the hopper.

The construction of the sweeper is described in detail in commonly assigned U.S. Pat. Nos. 4,037,284 to McDonald and 3,823,435 to Rhodes et al., which are incorporated by reference herein.

The sweeper assembly includes a positive drive for the brushes, as described in the above-referenced patents. Briefly, the wheel 24 includes a hub (not shown) having a central portion encircling the axis of the wheel. The hub includes an annular channel which is concentric with the axis of the wheel. As shown in FIG. 2, the radial outer wall of the channel includes an internal drive gear 48 and the radial inner wall of the channel includes an external drive gear 50.

In the disclosed embodiment, the shaft 40 of the sweeper brush 32 includes two oscillating gear ratchet drive units 10, near the distal ends of the shaft, which are received within the channel and mesh with the external drive gear 50 to provide a positive drive for the sweeper brush 32. Similarly, the shaft 44 of the second rotary brush 34 includes another pair of oscillating gear ratchet drive units which are received within the annular channel and mesh with the internal drive gear 48.

FIG. 2 shows a ratchet drive unit at one end of a shaft. A like arrangement is provided at the opposite end of the shaft, and another pair of ratchet drive units would be provided on shaft 44 for rotary brush 34. Accordingly, for each shaft, there would be a pair of gears at opposite ends of the shaft, and a pair of pins would be associated with each gear.

In accordance with the present invention, ratchet crown means having axially extending camming surfaces is provided on the major faces of each gear, and the gear moves axially and rotatably relative to the shaft when the gear rotates slower than the shaft, with the axial movement being limited and accommodated until the gear and shaft again rotate at the same speed. With this arrangement, the shaft is always rotated by the faster driven gear, so that maximum power is always provided to the sweeper. The ratchet drive action is accomplished with a minimum number of parts.

What is claimed is:

1. A ratchet drive unit providing for relative motion between a shaft and a drive member, comprising
   a shaft,
   a drive member,
   said drive member being positioned transversely with respect to said shaft and supported by said shaft, said drive member having a pair of opposing major faces,
   ratchet crown means on said opposing major faces of said drive member and having camming surfaces for producing axial movement of said drive member on said shaft, each of said camming surfaces terminating in an axial surface,
   means accommodating axial movement of said drive member on said shaft, and
   projecting means protruding radially outwardly from said shaft adjacent to said ratchet crown means and adapted to engage said axial surface to drive said shaft and to engage said camming surface to move said drive member axially,
   whereby relative rotational movement between said shaft and said drive member is provided by having said projecting means alternately engage said camming surfaces on said opposing major faces of said drive member to produce axial movement of said drive member with respect to said shaft.

2. A ratchet drive unit providing for relative motion between a shaft and a drive gear, comprising
a shaft,
a gear positioned transversely with respect to said shaft and supported on said shaft, said gear having a pair of opposing major faces and being operably connected to said drive gear,
ratchet crown means on said opposing major faces of said gear and having camming surfaces for producing axial movement of said gear on said shaft, said camming surfaces being spaced apart with the circumferential distance between said camming surfaces exceeding the circumferential length of said camming surfaces, and the camming surfaces on each face being offset in their entirety with respect to said camming surfaces on said opposite face, each of said camming surfaces terminating in an axial surface for driving said shaft, said camming surfaces projecting outwardly from said major faces by a predetermined distance,
axially spaced projecting means protruding radially outwardly from said shaft adjacent each of said ratchet crown means and adapted to engage said axial surface to drive said shaft, to engage said camming surface to move said gears axially, and to accommodate said axial movement,
whereby relative rotational movement of said shaft with respect to said gear will produce axial movement of said gear with respect to said shaft by having said projecting means alternately engage said camming surfaces on said opposing major surfaces of said gear.

3. A ratchet drive system as defined in claim 2, wherein the axial distance between said projecting means is at least as great as the width of one of said gears plus said predetermined distance and less than the width of one of said gears plus twice said predetermined distance.

4. A ratchet drive unit as defined in claim 2, wherein said ratchet crown means is integral with said drive member.

5. A ratchet drive unit as defined in claim 2, wherein said projecting means is integral with said shaft.

6. A ratchet drive unit as defined in claim 2, wherein said projecting means comprises a plurality of pins each of which is received in a transverse opening defined by said shaft.

7. A ratchet drive system providing for relative motion between two drive wheels, comprising
a shaft,
a pair of gears positioned transversely with respect to said shaft and supported by said shaft, each of said gears having a pair of opposing major faces and being operably connected to one of said drive wheels,
ratchet crown means on said opposing major faces of each gear and having camming surfaces for producing axial movement of said gears on said shaft, each of said camming surfaces terminating in an axial surface,
means accommodating axial movement of said gears on said shaft, and
projecting means protruding radially outwardly from said shaft adjacent to said ratchet crown means and adapted to engage said axial surface to drive said shaft and to engage said camming surface to move said gears axially,
whereby differences in speeds of rotation of said gears will produce relative rotation of said shaft with respect to the slower rotating gear and produce axial movement of said slower gear with respect to said shaft.

8. A ratchet drive system as defined in claim 7, wherein said ratchet crown means is integral with each of said gears.

9. A ratchet drive system as defined in claim 7, wherein said projecting means is integral with said shaft.

10. A ratchet drive system as defined in claim 7, wherein said projecting means comprises a plurality of pins each of which is received in a transverse opening defined by said shaft.

11. A rotary sweeper assembly comprising a pair of ground traversing drive wheels, a rotary ground engaging brush mounted on a shaft and having an axis of rotation parallel to the axis of said wheels and having a pair of gears operably connected to said drive wheels, a secondary rotary brush mounted on a shaft and having an axis of rotation parallel to the axis of said wheels and above the plane of said ground engaging brush and having a pair of gears operably connected to said drive wheels, said gears providing said brushes with positive drive in opposite directions for propelling particulate material to a collection means, the improvement comprising:
said gears associated with each of said shafts having a pair of opposing major faces and being positioned transversely with respect to said shaft and supported on said shaft,
ratchet crown means on said major faces of each of said gears and having camming surfaces for producing axial movement of said gears on each of said shafts, each of said camming surfaces terminating in an axial surface,
means accommodating axial movement of said gears, and
projecting means protruding radially outwardly from each of said shafts adjacent to each of said ratchet crown means and adapted to engage said axial surface to drive each of said shafts and to engage said camming surface to move said gears axially,
whereby differences in speeds of rotation of said gears will produce relative rotation of each of said shafts with respect to the slower rotating gears and produce axial movement of said slower gears with respect to said shafts.

12. A rotary sweeper as defined in claim 11, wherein said camming surfaces are spaced apart with the circumferential distance between said camming surfaces exceeding the circumferential length of said camming surfaces, and the camming surfaces on each of said major faces are offset in their entirety with respect to the camming surfaces on the other of said major faces.

13. A rotary sweeper as defined in claim 11, wherein the distance between said projecting means associated with each of said gears is at least as great as the width of one of said gears plus said predetermined distance, and less than the width of one of said gears, plus twice said predetermined distance, and said means accommodating axial movement is said projecting means.

14. A rotary sweeper as defined in claim 11, wherein said ratchet crown means is integral with said gears.

15. A rotary sweeper as defined in claim 11, wherein said projecting means is integral with said shafts.

16. A rotary sweeper as defined in claim 11, wherein each shaft defines transverse openings and said projecting means comprises a plurality of pins each of which is received in one of the openings.

* * * * *